United States Patent [19]

Suzuki

[11] Patent Number: 4,989,458
[45] Date of Patent: Feb. 5, 1991

[54] APPARATUS FOR DETECTING TORQUE FOR OSCILLATION-TYPE ELECTRIC DYNAMOMETER

[75] Inventor: Yorikatsu Suzuki, Kanagawa, Japan
[73] Assignee: Kabushiki Kaisha Meidensha, Tokyo, Japan
[21] Appl. No.: 331,445
[22] Filed: Mar. 31, 1989
[51] Int. Cl.$^5$ .............................. G01L 3/16; G01L 3/22
[52] U.S. Cl. .............................. 73/862.09; 73/862.17; 73/DIG. 10
[58] Field of Search ........... 73/862.08, 862.09, 862.17, 73/DIG. 10

[56] References Cited

U.S. PATENT DOCUMENTS

| | | | |
|---|---|---|---|
| 3,092,994 | 6/1963 | Moller | 73/862.08 |
| 4,457,182 | 7/1984 | McFarland | 73/862.18 |
| 4,478,090 | 10/1984 | McFarland | 73/862.09 |

FOREIGN PATENT DOCUMENTS 58-25217  5/1983  Japan .
62-26699  6/1987  Japan .

Primary Examiner—Charles A. Ruehl
Attorney, Agent, or Firm—Bachman & LaPointe

[57] ABSTRACT

An apparatus for detecting a torque quantity of an oscillation-type electric dynamometer which comprises a vibration detector installed on a torque arm extended from an oscillator of the dynamometer for detecting the vibration of the torque arm in the direction in which the torque arm applies a force to a load cell, a DC signal elimination circuit for eliminating signal components whose frequencies are in the proximity to a DC signal from the output signal of the vibration detector, a coefficient setting/adding circuit for deriving and setting a vibration torque of the oscillator from the output signal of the DC signal elimination circuit, and an adder for adding the output signal of the coefficient adding/setting circuit to the torque detection signal derived via the load cell to provide a torque detection output. Therefore, an output variation of the vibration detector due to the change in temperature of the vibration detector is eliminated by the DC signal elimination circuit.

5 Claims, 2 Drawing Sheets

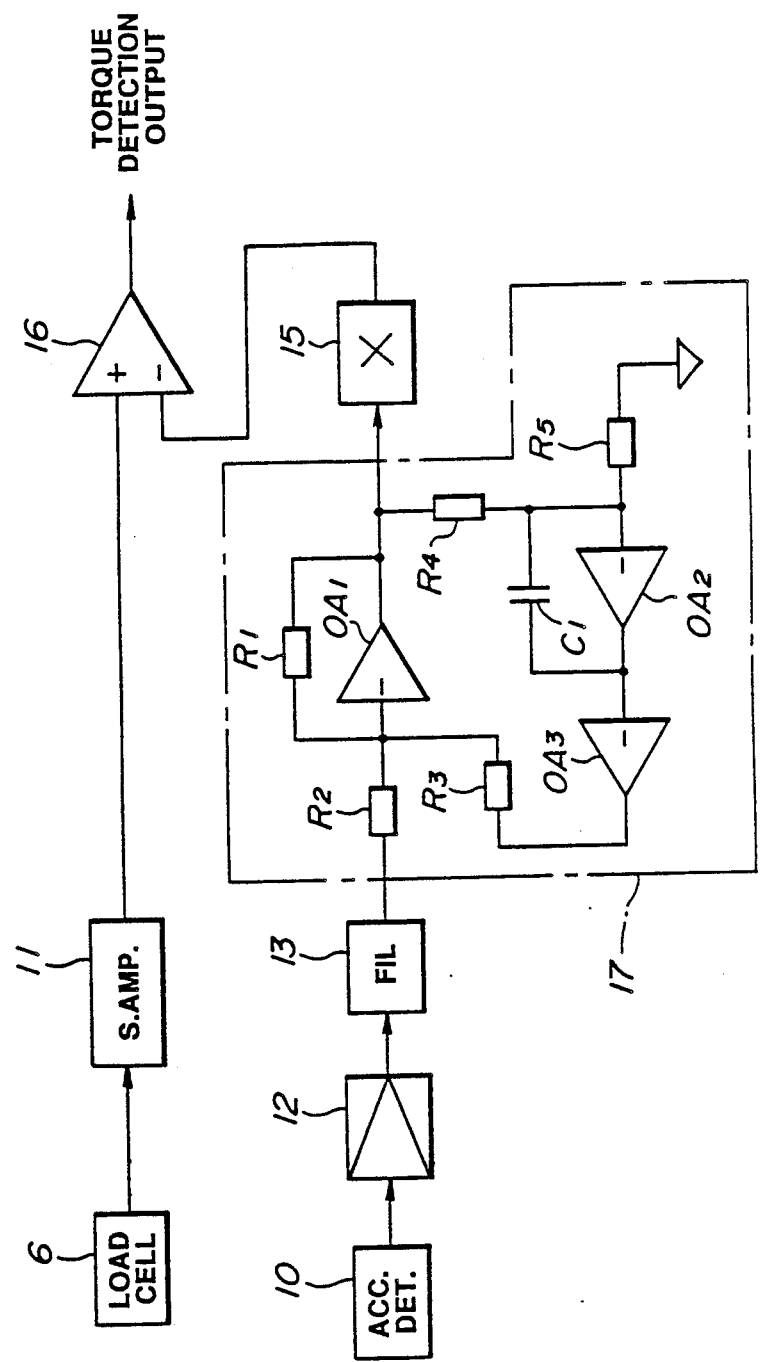

APPARATUS FOR DETECTING TORQUE FOR OSCILLATION-TYPE ELECTRIC DYNAMOMETER

BACKGROUND OF THE INVENTION

(1) Field of the Invention

The present invention relates to an apparatus for detecting torque of an oscillation-type electric dynamometer.

(2) Background of the Art

Japanese Patent Application second (Examined) Publications No. sho 58-25217 published on May 26, 1983 and No. sho 62-26699 published on June 10, 1987 exemplify apparatus for detecting a quantity of torque for oscillation-type dynamometers.

Such dynamometers are used to test various kinds of performance of an equipment to be tested, such as an engine, by adjusting a brake force and/or driving force of an electric motor, etc., against a torque and/or inertia force generated by the equipment under test.

One of the dynamometers includes an oscillation-type dynamometer having a torque controlling system of an electric motor in which an oscillator, supported by means of a floating apparatus so as to enable free oscillation, receives a rotational force, the rotational force is converted into a strain generated on a load cell engaging a torque arm extended from the oscillator, and a torque detection signal amplified from the strain on the load cell serves as a feedback signal of the torque controlling system constituted by the electric motor.

In the above-described oscillation-type electric dynamometer, a responsive characteristic of the torque controlling system using the dynamometer has been reduced due to delays of strain detections in the load cell and associated strain amplifier to be described later and caused by an inertia of the oscillator and due to ripples, vibrations, and noises caused by natural vibrations of the load cell and anti-vibration rubber member in the torque detection signal.

These disadvantages are basically caused by vibrations generated due to the inertia of the oscillator. In the above-identified Japanese patent Application Second publications, the vibrations generated due to the inertia of the oscillator are detected and the detected vibrations are added to the detected torque quantities with a reverse polarity to an output signal derived from the load cell so that unnecessary signal components included in the output signal of the load cell are cancelled.

However, the torque detecting apparatus disclosed in the above-identified Japanese Patent Application Second Publications drawbacks as will be described below.

That is to say, the torque detecting apparatus described above includes a vibration detector, installed on the torque arm extended from the oscillator, for detecting the vibration of the torque arm in the direction in which the torque arm applies a force to the load cell. The detected signal is used to correct the output signal of the load cell. The torque detecting apparatus further includes a strain amplifier which transducers the output signal of the load cell into a corresponding torque detection voltage; another amplifier, connected to the vibration detector, for amplifying the detection signal of the vibration detector; a coefficient setting/adding circuit, connected to the other amplifier via a filter and low-level signal elimination circuit, for calculating a coefficient to be combined with the acceleration amplified vibration detection signal; and an adder for adding the coefficient combined vibration detection signal to the torque detection voltage derived from the strain amplifier and for outputting the added signal as a torque detection output.

Although the above-described torque detecting apparatus can make a remarkable improvement of measurement accuracy of the torque reduced due to variations of zero point, enhancing the responsive characteristic of the torque detection signal from the torque detecting apparatus, a signal level clipped by means of the low-level elimination circuit needs to be made large when a temperature change which affects the output signal of the vibration detector becomes large so that the zero point of the torque detection signal is deviated from a real zero point.

Therefore, all detection signals whose levels are smaller than a clip level set by means of the low-level signal component elimination circuit are eliminated. In addition, although it becomes effective to detect the torque in states where impact absorption occurs within a gap between a knife edge of the torque arm and load cell and where the knife edge is fitted into the load cell with the gap provided, a correct torque waveform of the detection output of the adder becomes distorted due to a clipped real vibration detection signal in a state where the torque is applied to the load cell whose level exceeds a certain magnitude.

SUMMARY OF THE INVENTION

It is therefore an object of the present invention to provide an apparatus for detecting a torque of an electric dynamometer which can accurately detect a vibration detection signal over a wide frequency range without distortion, achieving improvements in responsive characteristic and accuracy of the torque detection output signal.

The above-described object can be achieved by providing an apparatus for detecting a torque of an oscillation-type electric dynamometer, comprising: (a) a detector for detecting the vibration of a torque arm of the dynamometer in the direction in which the torque arm applies a force to the load cell; (b) a DC signal component elimination circuit for eliminating signal components derived from the detector which are in the proximity to a DC signal; (c) a coefficient setting/adding circuit for setting a coefficient associated with the oscillator inertia and deriving a vibration torque of the oscillator from the output signal of the DC signal component elimination circuit; (d) a torque detection circuit for detecting a force received from the torque arm of an oscillator of the dynamometer and outputting the detected force representative signal; and (e) a first adder for adding the detected force representative signal and an output signal of the coefficient setting/adding circuit to provide a detection signal of a torque derived from the oscillator.

The above-described object can also be achieved by providing an apparatus for detecting a torque quantity of an oscillation-type electric dynamometer, comprising: (a) a detector for detecting the vibration of the torque arm in the direction in which the torque arm applies a force to the load cell; (b) a DC signal component elimination circuit for eliminating a DC signal component of the detection signal of the detector and signal components derived from the detector which are in the proximity to the DC signal component; (c) a coefficient setting/adding circuit for setting a coefficient associated with the oscillator inertia and deriving a vibration torque of the oscillator from the output signal of the DC signal component elimination circuit; (d) a torque detection circuit for detecting a force received from a torque arm of an oscillator of the dynamometer and outputting the detected force representative signal; and (e) a first adder for adding the detected force representative signal and an output signal of the coefficient setting/adding circuit to provide a detection signal of a torque derived from the oscillator.

BRIEF DESCRIPTION OF THE DRAWINGS

FIG. 1 (B) is a schematic view of an engagement portion of a knife edge of a torque arm with a load cell shown in FIG. 1 (A).

FIG. 2 is a schematic circuit block diagram of the torque detecting apparatus in a preferred embodiment according to the present invention.

DETAILED DESCRIPTION OF THE PREFERRED EMBODIMENT

Reference will hereinafter be made to the drawings in order to facilitate understanding of the present invention.

Figure 1A:
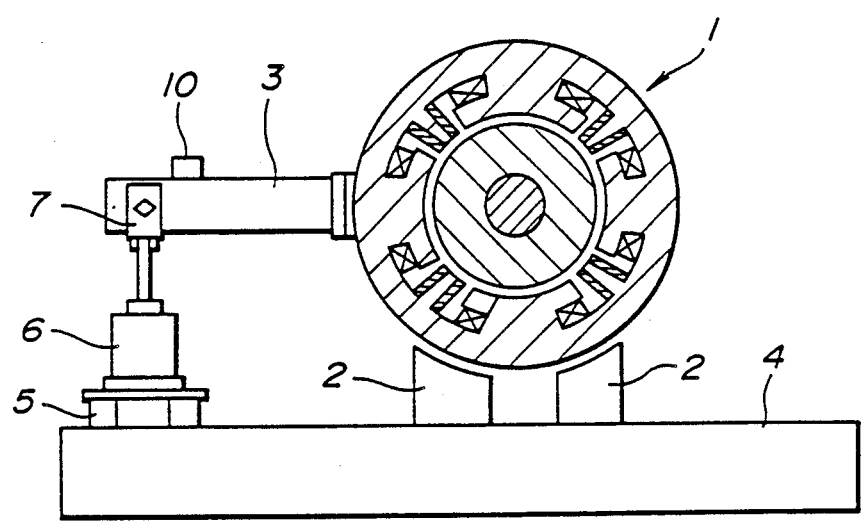
FIG. 1 (A) is a schematic view of an oscillation-type electric dynamometer to which a torque detecting apparatus according to the present invention is applicable.
Figure 1B:
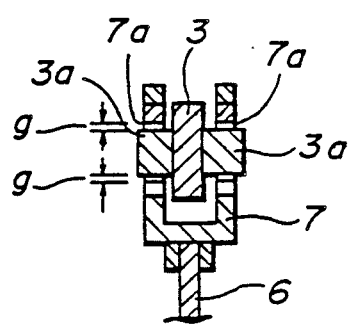

FIGS. 1 (A) and 1 (B) show a structure of an oscillation type electric dynamometer to which a torque detecting apparatus to the present invention is applicable.

In FIGS. 1 (A) and 1 (B), an oscillator 1 is supported by means of a hydraulic floating apparatus 2 as to enable oscillation of the oscillator 1 on the floating apparatus 2.

A tip end of a torque arm 3 extended from the oscillator 1 is linked with a receiving arm 7 of a load cell 6 fixed by means of an anti-vibration rubber member 5 installed on a bed 4.

The torque arm 3 and receiving arm 7 are linked together via a knife edge 3a and fitting holes 7a. The knife edge 3a causes the load cell 6 to prevent a fluctuation of a zero point of the load cell output and reduction of accuracy of the load cell output due to an application of a bending moment to the load cell 6.

The linkage between the torque arm 3 and receiving arm 7 with gaps absorbs the generation of the bending moment caused by a change of the oscillator in the axial direction of the oscillator 1 and an unbalanced temperature change of the dynamometer itself.

A vibration detector 10 is installed on the torque arm 3 which detects the vibration of the torque arm 3 in the direction in which the torque arm applies a force to the load the load cell 6. The vibration detection signal corrects the detection signal of the load cell 6, as will be described later.

A mutual relationship between a force applied to the load cell 6 and the torque quantity picked up from the load cell 6 is defined as follows.

$$F = T/L \qquad (1)$$

$$F^1 = Kx \qquad (2)$$

$$W = J/L^2 \qquad (3)$$

In the equations (1) to (3) F denotes a conversion of the generation torque of the dynamometer to a force at a tip of the torque arm 3, the force being applied to both ends of the load cell 6, $F^1$ denotes the force applied to the load cell 6, W denotes a conversion of the torque arm vibration to a force at a torque arm tip (load cell force applied point), the force being applied to both ends of the load cell 6, T denotes the torque generated by the load cell, J denotes the vibration moment of the torque arm, L denotes the distance from the tip of the torque arm to an axial center of the dynamometer, and x denotes an equivalent displacement of the torque arm.

With each condition expressed in the equations (1) to (3) taken into account, the following equation is established between the actual force applied to the load cell 6 and generation torque of the dynamometer.

$$T/L + Wd^2x/dt^2 - Kx = 0 \qquad (4)$$

Then, if the equations (2) and (3) are substituted into the equation (4), the following equations are established.

$$T/L + J/L^2 d^2x/dt^2 - F^1 = 0 \qquad (5)$$

$$T/L = F^1 - J/L^2 \, d^2x/dt^2 \qquad (6)$$

If the equation (6) is modified the following equation is established.

$$T = (F^1 - J/L^2 \, d^2x/dt^2) \times L \qquad (7)$$

If the equation (7) is modified, the generation torque of the dynamometer T is expressed as follows.

$$T = F^1 L - J/L \, d^2x/dt^2 \qquad (8)$$

A first item of the right side of the equation (8) denotes the actual torque detection signal and a second item of the right side of the equation (8), i.e., $J/L \, d^2x/dt^2$ is a detected value of the vibration of the torque arm from the vibration detector 10. As appreciated from the equation (8), the real torque quantity generated by the dynamometer is a subtraction of a product of the quantity of the detected of the vibration from the actual torque quantity picked up from the load cell 6.

The structure of the oscillation-type electric dynamometer is exemplified by the Japanese Patent Application Second Publications No. sho 58-25217 and No. sho 62-26699.

FIG. 2 shows a preferred embodiment of the torque detection circuit according to the present invention.

In FIG. 2, a strain amplifier 11 connected to the load cell 6 converts and amplifies the output signal of the load cell 6 into a torque detection voltage. The load cell 6 uses either a resistance wire strain gage method, or magnetostrictor method, or a piezoelectric method, known in the art sensing the applied load.

An amplifier 12 is connected to the vibration detector 10. A filter 13 eliminates the vibration signal components outside of a frequency range required. A coefficient setting/adding circuit 15 sets the coefficient to derive the vibration torque corresponding to a rate of change in speed of the oscillator inertia. The coefficient in the coefficient setting/adding circuit 15 is determined (emprically) according to the oscillator inertia and the structure of the vibration detector.

An adder 16 constituted by an operational amplifier has a positive input terminal connected to the strain amplifier 11 and a negative input terminal connected to the coefficient setting/adding circuit 15. The adder 16 adds the output signals of the coefficient setting/adding circuit 15 and the strain amplifier 11 to derive the real torque quantity of the dynamometer.

A direct current (DC) signal component elimination circuit 17 is intervened between the filter 13 and coefficient setting/adding circuit 15.

The DC signal component elimination circuit 17 includes a second adder, an integrator having a zero reference value, and inverting amplifier connected to the integrator.

The adder of the DC signal component elimination circuit 17 has an operational amplifier $OA_1$ having a gain of 1 and resistors $R_1$, $R_2$, and $R_3$. The integrator thereof has an operational amplifier $OA_2$, a capacitor $C_1$, which acts as a low-pass filter and resistors $R_4$ and $R_5$ which act as a subtractor. The inverting amplifier has an operational amplifier $OA_3$.

When the output signal level of the filter 13 is slowly varied, the output change of the operational amplifier $OA_1$ is detected by the integrator $OA_2$, $C_1$, $R_4$, and $R_5$ and inverted by the inverting amplifier $OA_3$. The inverted output signal of the inverting amplifier is then added to the adder 16, in the DC signal component elimination circuit, with a reverse polarity to the output signal of the filter 13. Therefore, the output level of the adder 16 is maintained at a zero level. It is noted that when the output of the filter 13 is changed with a period sufficiently small as compared with a time constant of the integrator, the output signal of the filter 13 directly appears and is transmitted to the coefficient setting/adding circuit 15.

Hence, when the generation torque of the oscillator 1 is constant, the displacement of the load cell 6 is constant. At this time, the output signal level of the vibration detector 10 is required to become zero.

If the output signal level of the vibration detector 10 is deviated from the zero point, the DC signal component elimination circuit 17 serves to correct it to zero level.

On the other hand, when the oscillation of the oscillator 1 is involved with the generation torque of the oscillator constant, the detection signal of the vibration detector 10 appearing due to its oscillation is not zeroed by means of the DC signal component eliminator 17 but is directly transmitted to the coefficient setting/adding circuit 15. The vibration torque generated due to the oscillation is corrected with the output signal of the coefficient setting/adding circuit 15 by means of the adder 16. Consequently, the torque detecting apparatus can detect the torque generated by the dynamometer up to a frequency range exceeding 30 Hz without distortion of the torque detection signal.

The operation of the DC signal component elimination circuit 17 will be described in more details with reference to FIG. 2.

The resistors $R_4$ and $R_5$ are input resistors of the operational amplifier $OA_2$ and serve as a kind of comparator. The capacitor $C_1$ acts as a low-pass filter and operates amplifier $OA_2$ as the integrator so that the integrator serves as an amplifier for amplifying only the DC signal components. The inverting amplifier $OA_3$ serves to add the output signal of the operational amplifier $OA_2$ to the input signal derived from the filter 13 with its reverse polarity. The circuit 17 acts as a feedback circuit for automatically zeroing the DC voltage level at the output terminal of the circuit 17 and the resistor $R_5$ functions as an input circuit of a zero setting circuit. A signal whose frequency exceeds a cut-off frequency determined by the resistors $R_4$ and $R_5$ and the capacitor $C_1$ is outputted from the output terminal of the circuit 17. Although such a signal whose frequency is in the vicinity of the cut-off frequency is more or less attenuated, almost all of the signals whose frequencies are three times to five times higher than the cut-off frequency can be outputted from the output terminal of the circuit 17.

The DC signal component elimination circuit is thus generally constituted by a adder for adding the output signal from the filter 13 to the output signal of the inverting amplifier, the inverting amplifier, the output signal of the adder being that of the circuit 17, a low-pass filter for passing only the DC signal component of the output signal of the adder, and a subtractor for subtracting the ground level from the output signal of the low-pass filter and outputting the subtracted result to the inverting amplifier.

The structure of the DC signal component elimination circuit 17 may alternatively be changed.

As described hereinabove, since, in the torque detecting apparatus according to the present invention, the DC signal components are eliminated from the signal of the vibration detector so that the highly responsive characteristic of the torque detection can be assured and the reduction of detection accuracy of the torque due to the temperature variation of the vibration signal derived from the vibration detector can be prevented.

It will be fully appreciated by those skilled in the art that the foregoing description is made in terms of the preferred embodiment and various changes and modifications may be made without departing from the scope of the present invention which is to be defined by the appended claims.

What is claimed is:

1. An apparatus for detecting torque of an oscillation-type electric dynamometer having a torque arm extending from the dynamometer and a load cell linked to the torque arm comprising:
   (a) a torque detection circuit for detecting a force received from the torque arm of the dynamometer and outputting the detected force representative signal;
   (b) a detector means for detecting the vibration of the torque arm in the direction in which the torque arm applies a force to the load cell;
   (c) a DC signal component elimination circuit for eliminating frequency signal components proximate to a DC signal which results from vibration of the torque arm appearing on the load cell and derived form the detector means;
   (d) a coefficient setting/adding circuit for setting a coefficient related to the vibration of the torque arm derived from the output signal of the DC signal component elimination circuit; and
   (e) a first adder for adding the detected force representative signal and an output signal of the coefficient setting/adding circuit to provide a detection signal of a torque derived from the dynamometer.

2. An apparatus according to claim 1 wherein the DC signal component elimination circuit includes a second adder connected between the detector means and the coefficient setting/adding circuit, an integrator connected between the second adder and the coefficient setting/adding circuit and inverting amplifier connected between the second adder and integrator.

3. An apparatus according to claim 1 wherein the DC signal component elimination circuit includes a second adder having an input terminal connected (1) to the detector means and (2) to an inverting amplifier and an output terminal, an integrator connected to the output terminal, the integrator includes a low-pass filter for passing only the DC signal component from the output terminal of the second adder and a subtractor connected to the low-pass filter for subtracting the ground level from the output signal of the low-pass filter and outputting the subtracting result to the inverting amplifier.

4. An apparatus according to claim 3 wherein the second adder includes a first operational amplifier having an input terminal connected (1) to an output terminal via a first resistor, (2) to an output terminal of a filter circuit of the detector means via a second resistor, and (3) to a third resistor, the inverting amplifier includes a second operational amplifier having an output terminal connected to the third resistor, the subtractor includes a fourth resistor connected to the output terminal of the first operational amplifier and a fifth resistor connected to the ground, and the integrator includes a third operational amplifier having a input terminal connected to an output terminal thereof via the low-pass filter which includes a capacitor.

5. A method for detecting torque of an oscillation-type electric dynamometer having a torque arm extending from the dynamometer and a load cell linked to the torque arm comprising:
  (a) detecting a force received from the torque arm of the dynamometer and outputting the detected force representative signal;
  (b) detecting the vibration of the torque arm in the direction in which the torque arm applies force to the load cell;
  (c) eliminating a DC signal component from the detected vibration of the torque arm;
  (d) setting a coefficient related to the vibration of the torque arm derived after eliminating the signal component; and
  (e) adding the detected force signal and the coefficient setting signal to provide a detection signal of a torque derived from the dynamometer.

* * * * *